United States Patent [19]

Hagihara et al.

[11] Patent Number: 5,202,044

[45] Date of Patent: Apr. 13, 1993

[54] WORKING FLUID COMPOSITION FOR REFRIGERATING MACHINE

[75] Inventors: Toshiya Hagihara, Izumisano; Akimitsu Sakai, Wakayama, both of Japan

[73] Assignee: Kao Corporation, Tokyo, Japan

[21] Appl. No.: 757,136

[22] Filed: Sep. 10, 1991

[30] Foreign Application Priority Data

Sep. 12, 1990 [JP] Japan .................. 2-243069
Jun. 17, 1991 [JP] Japan .................. 3-173089
Jul. 20, 1991 [JP] Japan .................. 3-204884

[51] Int. Cl.$^5$ .................. C09K 5/04; C10M 105/38
[52] U.S. Cl. .................. 252/68; 252/56 R; 252/56 S; 252/67; 62/114
[58] Field of Search .............. 252/68, 67, 56 R, 56 S; 62/114

[56] References Cited

U.S. PATENT DOCUMENTS

| 2,807,155 | 9/1957 | Williamitis | 62/509 |
| 3,202,701 | 8/1965 | Young et al. | 560/199 |
| 4,155,861 | 5/1979 | Schmitt et al. | 252/565 |
| 4,755,316 | 7/1988 | Magid et al. | 252/68 |
| 4,851,144 | 7/1989 | McGraw et al. | 252/52 A |
| 4,948,525 | 8/1990 | Sasaki et al. | 252/52 A |
| 5,021,179 | 6/1991 | Zehler et al. | 252/54.6 |

FOREIGN PATENT DOCUMENTS

| 0406479 | 1/1991 | European Pat. Off. . |
| 0430657 | 6/1991 | European Pat. Off. . |
| 0440069 | 8/1991 | European Pat. Off. . |
| 143609 | 12/1978 | Japan . |
| 55-155093 | 12/1980 | Japan . |
| 155093 | 12/1980 | Japan . |
| 36570 | 4/1981 | Japan . |
| 125494 | 10/1981 | Japan . |
| 56-125494 | 10/1981 | Japan . |
| 125495 | 10/1981 | Japan . |
| 131548 | 10/1981 | Japan . |
| 133241 | 10/1981 | Japan . |
| 57-63395 | 4/1982 | Japan . |
| 15592 | 1/1983 | Japan . |
| 103594 | 6/1983 | Japan . |
| 164393 | 9/1984 | Japan . |
| 62596 | 3/1986 | Japan . |
| 131895 | 8/1986 | Japan . |
| 171799 | 8/1986 | Japan . |
| 592 | 1/1987 | Japan . |
| 292895 | 12/1987 | Japan . |
| 198694 | 8/1989 | Japan . |
| 256594 | 10/1989 | Japan . |
| 259093 | 10/1989 | Japan . |
| 259094 | 10/1989 | Japan . |
| 259095 | 10/1989 | Japan . |
| 84491 | 3/1990 | Japan . |
| 102296 | 4/1990 | Japan . |
| 129294 | 5/1990 | Japan . |
| 132176 | 5/1990 | Japan . |
| 132177 | 5/1990 | Japan . |
| 132178 | 5/1990 | Japan . |
| 132179 | 5/1990 | Japan . |
| 158698 | 6/1990 | Japan . |
| 173195 | 7/1990 | Japan . |
| 180986 | 7/1990 | Japan . |
| 180987 | 7/1990 | Japan . |
| 182780 | 7/1990 | Japan . |
| 1460665 | 1/1977 | United Kingdom . |
| 2216541 | 10/1989 | United Kingdom . |
| 90/05174 | 5/1990 | World Int. Prop. O. . |
| 90/12849 | 11/1990 | World Int. Prop. O. . |

Primary Examiner—Christine Skane
Attorney, Agent, or Firm—Birch, Stewart, Kolasch & Birch

[57] ABSTRACT

The present invention is directed to a working fluid composition for refrigerating machine comprising: (i) a hydrofluorocarbon, (ii) a compound having an epoxycyclohexyl group and/or a compound having an epoxycyclopentyl group, and (iii) an ester formed between a neopentylpolyol and a saturated branched aliphatic monocarboxylic acid having a carbon number of 7 to 9.

The working fluid composition of the present invention is excellent in compatibility, lubricity, thermal stability and insulating property.

20 Claims, No Drawings

WORKING FLUID COMPOSITION FOR REFRIGERATING MACHINE

FIELD OF THE INVENTION

The present invention relates to a working fluid composition for refrigerating machine, more specifically to a working fluid composition for a compression refrigerating machine used in electric refrigerators etc.

BACKGROUND OF THE INVENTION

The use of dichlorodifluoromethane (CFC12) for refrigerators and automotive air conditioners has recently been legally regulated to protect the ozone layer, and will be totally banned. Thus, hydrofluorocarbons which do not destroy the ozone layer, such as 1,1,1,2-tetrafluoroethane (HFC134a), have been developed as substitutes for CFC12.

However, since the polarity of hydrofluorocarbons is higher than that of CFC12, the use of conventional refrigeration lubricating oils, such as naphthenic mineral oil, poly-α-olefin or alkylbenzene, causes two-layer separation of the working fluid at low temperatures. This is due to the poor compatibility between the conventional lubricating oils and hydrofluorocarbons. Two-layer separation hampers oil return, which in turn interferes with heat transfer due to the deposition of a thick oil film around the condenser and evaporator which serve as heat exchangers. It can also cause important failures such as poor lubrication, and foaming upon starting operation. Therefore, the conventional refrigeration oils cannot be used in the presence of these new refrigerants.

As for lubricity, CFC12 generates hydrogen chloride upon partial decomposition. The which hydrogen chloride thus formed reacts on the friction surface to form a coating of chloride which provides a lubricity improving effect. On the other hand, hydrofluorocarbons are not expected to have such an effect because they contain no chlorine atom; therefore, the refrigeration oils used in combination with hydrofluorocarbons are required to have better lubricity than that of the conventional refrigeration oils.

In addition, the refrigeration oils used in combination with hydrofluorocarbons need to have good thermal stability in the presence of hydrofluorocarbons.

Moreover, since organic substances are present in the compression refrigerating machines for electric refrigerators as materials for motor components such as insulators and enameled wires, the working fluid comprising a hydrofluorocarbon and a refrigeration oil must not adversely affect these organic materials and must have a good insulating property.

Polyether compounds which can be used as refrigeration oils in combination with hydrofluorocarbons such as HFC134a are disclosed in U.S. Pat. No. 4,755,316, Japanese Patent Laid-Open Nos. 198694/1989, 256594/1989, 259093/1989, 259094/1989, 259095/1989, 84491/1990, 102296/1990, 129294/1990, 132176/1990, 132177/1990, 132178/1990, 132179/1990, 173195/1990, 180986/1990, 180987/1990 and 182780/1990 and other publications.

Since polyether compounds have a polarity higher than that of naphthenic mineral oils, their compatibility with HFC134a at low temperatures is really good. However, polyether compounds cannot be safely used as refrigeration oils, since they pose a problem of two-layer separation upon rise in temperature, as stated in U.S. Pat. No. 4,755,316.

Polyether compounds involve other problems as well. Among them is their poor insulating property. This is a serious a very important problem which makes it impossible to use polyether compounds for refrigerating machines used in electric refrigerators. Another problem is their high hygroscopicity. The moisture in the polyether compound degrades the thermal stability in the presence of HFC134a and causes organic materials such as PET films to be hydrolyzed.

Moreover, polyether compounds are not satisfactory as to their lubricity; systems of a hydrofluorocarbon refrigerant such as HFC134a and a polyether compound are inferior to conventional systems of CFC12 and a naphthenic mineral oil.

On the other hand, there have been proposed some methods using an ester in combination with fluoromethane in the field of refrigerating machines, including those disclosed in Japanese Patent Laid-Open Nos. 131548/1981, 133241/1981, 181895/1986 and 592/1987 and other publications. Also, Japanese Patent Laid-Open Nos. 125494/1981, 125495/1981 and 62596/1986 describe the use of an ester in mixture with another lubricating oil. Examples of the use of an ester in the presence of an additive are described in Japanese Patent Laid-Open Nos. 155093/1980, 36570/1981, 125494/1981, 15592/1983, 103594/1983, 171799/1986 and 292895/1987.

However, these methods are all based on a system used in combination with a dichlorodifluoromethane (CFC12) or monochlorodifluoromethane (HCF22) refrigerant, and none of them makes mention of a hydrofluorocarbon refrigerant. In addition, their object is to improve the thermal stability in the presence of CFC12 or HCFC22.

Japanese Patent Laid-Open Nos. 143609/1978 and 164393/1984 describe the compatibility with fluoromethane as well as the improvement in the thermal stability in the presence of fluoromethane, but their object is to avoid excess dissolution in CFC12 in the former case and in HCFC22 in the latter case, and no description is given on the improvement in the compatibility with hydrofluorocarbon refrigerants.

Methods using a hydrofluorocarbon such as HFC134a and an ester in combination are described in U.S. Pat. No. 4,851,144 and Japanese Patent Laid-Open No. 158693/1990. However, both of these publications both describe the use of a polyether compound partially mixed with an ester in combination with HFC134a; and neither of them makes mention of the use of an ester alone nor is there a description of the object of adding an ester.

As stated above, as far as the prior art is concerned, none of the existing compositions comprising a hydrofluorocarbon and oil for refrigerating a machine used in electric refrigerators etc., meet the requirements for compatibility, lubricity, thermal stability, insulating property and other properties.

SUMMARY OF THE INVENTION

Accordingly, it is an object of the present invention to provide a working fluid composition for refrigerating the machine used in electric refrigerators etc., which is excellent in compatibility, lubricity, thermal stability, insulating property and other properties.

With the aim of accomplishing the object described above, the present inventors made investigations and found that the object can be accomplished by the use of a certain ester compound or a mixture prepared by adding a compound having an epoxycyclohexyl group or epoxycyclopentyl group to an ester compound, and have thus developed the present invention.

In essence, the present invention relates to: (1) a working fluid composition for a refrigerating machine comprising: a hydrofluorocarbon and an ester formed between a neopentylpolyol and a saturated branched aliphatic monocarboxylic acid having a carbon number of 7 to 9, (2) a working fluid composition for a refrigerating machine comprising: a hydrofluorocarbon and a refrigeration oil prepared by adding a compound having an epoxycyclohexyl group and/or a compound having an epoxycyclopentyl group to an ester formed between a neopentylpolyol and a saturated branched aliphatic monocarboxylic acid having a carbon number of 7 to 9 in a ratio of 0.05 to 2.0 parts by weight to 100 parts by weight of the ester, and (3) a working fluid composition for a refrigerating machine comprising: a hydrofluorocarbon and a refrigeration oil prepared by adding a compound having an epoxycyclohexyl group and/or a compound having an epoxycyclopentyl group to an ester formed between a neopentylpolyol and a saturated branched aliphatic monocarboxylic acid having a carbon number of 7 to 9 in a ratio of 0.05 to 2.0 parts by weight to 100 parts by weight of the ester and adding at least one compound selected from the group comprising a triaryl phosphate and/or a triaryl phosphite, benzotriazole and/or a benzotriazole derivative and a metal deactivator capable of chelating in a ratio of 0.1 to 5.0 parts by weight, 0.001 to 0.1 part by weight and 0.001 to 2.0 parts by weight to 100 parts by weight of the ester.

DETAILED DESCRIPTION OF THE INVENTION

The alcohol moiety of an ester or an ester composition used for the present invention is a neopentylpolyol. Examples thereof include neopentyl glycol, 2,2-diethyl-1,3-propanediol, 2-n-butyl-2-ethyl-1,3-propanediol, trimethylolethane, trimethylolpropane, trimethylolnonane, pentaerythritol and dipentaerythritol, with preference given to neopentyl glycol, trimethylolpropane and pentaerythritol. These neopentylpolyols surpass the polyhydric alcohols having hydrogen at the α-position in heat resistance.

The carboxylic acid moiety of an ester or an ester composition used for the present invention is a saturated branched aliphatic monocarboxylic acid having a carbon number of 7 to 9. Examples thereof include 2,2-dimethylpentanoic acid, 2-ethylpentanoic acid, 3-ethylpentanoic acid, 2-methylhexanoic acid, 3-methylhexanoic acid, 4-methylhexanoic acid, 5-methylhexanoic acid, cyclohexanecarboxylic acid, cyclopentylacetic acid, 2-ethylhexanoic acid, 3,5-dimethylhexanoic acid, 2,2-dimethylhexanoic acid, 2-methylheptanoic acid, 3-methylheptanoic acid, 4-methylheptanoic acid, 2-propylpentanoic acid, 3,4-dimethylhexanoic acid, cyclohexylacetic acid, 3-cyclopentylpropionic acid, 2,2-dimethylheptanoic acid, 3,5,5-trimethylhexanoic acid, 2-methyloctanoic acid, 2-ethylheptanoic acid, 3-methyloctanoic acid, 2-ethyl-2,3,3-trimethylbutyric acid, 2,2,4,4-tetramethylpentanoic acid and 2,2-diisopropylpropionic acid, with preference given to 2-methylhexanoic acid, 2-ethylhexanoic acid, 3,5-dimethylhexanoic acid and 3,5,5-trimethylhexanoic acid.

Esters of monocarboxylic acids having a carbon number exceeding 9 and esters of monocarboxylic acids having a carbon number under 7 are undesirable, since the compatibility with hydrofluorocarbons is poor in the former case and since the metal corrosivity can increase in the latter case. From the viewpoint of hydrolysis resistance and metal corrosivity, esters of branched monocarboxylic acids are preferable to those of linear monocarboxylic acids. Esters of branched monocarboxylic acids are superior also from the viewpoint of the compatibility with hydrofluorocarbons. For example, the critical temperature of dissolution with HFC134a is lower in trimethylolpropane tri-2-methylhexanate at $-60°$ C. than in trimethylolpropane triheptanate at $-20°$ C., and lower in trimethylolpropane tri-2-ethylhexanate at $-33°$ C. and trimethylolpropane tri-3,5-dimethylhexanate at $-27°$ C. than in trimethylolpropane trioctanate at $30°$ C. Also, the critical temperature of dissolution with HFC134a is lower in pentaerythritol tetra(3,5,5-trimethylhexanate) at $-25°$ C. than in pentaerythritol tetranonanate at over $30°$ C. From these data, it is evident that esters of branched monocarboxylic acids are superior.

From the viewpoint of thermal stability, esters of saturated monocarboxylic acids are preferable to those of unsaturated monocarboxylic acids.

As seen from the data given below, the four types of esters of branched monocarboxylic acids shown above rank in the descending order of 2-methylhexanates > 3,5,5-trimethylhexanates > 2-ethylhexanates > 3,5-dimethylhexanates with respect to the compatibility with HFC134a, i.e., 2-methylhexanates are the best.

Neopentyl glycol di-2-methylhexanate (critical temperature of dissolution with HFC134a: under $-70°$ C.)
Neopentyl glycol di-3,5,5-trimethylhexanate (critical temperature of dissolution with HFC134a: $-69°$ C.)
Neopentyl glycol di-2-ethylhexanate (critical temperature of dissolution with HFC134a: $-64°$ C.)
Neopentyl glycol di-3,5-dimethylhexanate (critical temperature of dissolution with HFC134a: $-60°$ C.)
Trimethylolpropane tri-2-methylhexanate (critical temperature of dissolution with HFC134a: $-60°$ C.)
Trimethylolpropane tri-3,5,5-trimethylhexanate (critical temperature of dissolution with HFC134a: $-40°$ C.)
Trimethylolpropane tri-2-ethylhexanate (critical temperature of dissolution with HFC134a: $-33°$ C.)
Trimethylolpropane tri-3,5-dimethylhexanate (critical temperature of dissolution with HFC134a: $-27°$ C.)
Pentaerythritol tetra-2-methylhexanate (critical temperature of dissolution with HFC134a: $-40°$ C.)
Pentaerythritol tetra-3,5,5-trimethylhexanate (critical temperature of dissolution with HFC134a: $-25°$ C.)
Pentaerythritol tetra-2-ethylhexanate (critical temperature of dissolution with HFC134a: $-9°$ C.)
Pentaerythritol tetra-3,5-dimethylhexanate (critical temperature of dissolution with HFC134a: $0°$ C.)

From the viewpoint of hydrolysis resistance, 2-methylhexanates and 2-ethylhexanates, all of which have a branched chain at the α-position of the carbonyl group, are superior to 3,5-dimethylhexanates and 3,5,5-trimethylhexanates, none of which has a branched chain at the α-position. Thus, 2-methylhexanates are the best, judging from the viewpoint of the compatibility with HFC134a and hydrolysis resistance.

It is therefore desirable that the ester for the present invention contains 2-methylhexanoic acid at the carboxylic acid moiety; it is very desirable that esters of dihydric neopentylpolyol contain 2-methylhexanoic acid at not less than 70% by weight of the total carboxylic acid content and esters of trihydric and higher polyhydric neopentylpolyol contain 2-methylhexanoic acid at not less than 25% by weight of the total carboxylic acid content. In this case, it is very desirable that the carboxylic acid contains a saturated branched aliphatic monocarboxylic acid having a carbon number of 7 to 9 at not less than 70% by weight of the total carboxylic acid content and 2-methylhexanoic acid as said saturated branched aliphatic monocarboxylic acid at not less than 25% by weight of the total carboxylic acid content. Here, the saturated branched aliphatic monocarboxylic acid having a carbon number of 7 to 9 particularly preferably comprises 2-methylhexanoic acid alone or a mixed acid comprising 2-methylhexanoic acid and at least one acid selected from the group comprising 2-ethylhexanoic acid, 3,5-dimethylhexanoic acid and 3,5,5-trimethylhexanoic acid. Although such a mixed acid is not subject to limitation, a mixed acid of 2-methylhexanoic acid and 3,5,5-trimethylhexanoic acid may be mentioned as a preferred example.

In the case of esters of dihydric neopentylpolyol, a good balance of properties, namely, compatibility with hydrofluorocarbons, hydrolysis resistance, viscosity index and other properties can be obtained when the 2-methylhexanoic acid content is greater than 70% by weight of the total carboxylic acid content. In the case of esters of trihydric and higher polyhydric neopentylpolyol, a good balance of properties, namely, compatibility with hydrofluorocarbons, hydrolysis resistance, viscosity index, low temperature fluidity and other properties can be obtained when the 2-methylhexanoic acid content is greater than 25% by weight of the total carboxylic acid content and the content of the saturated branched aliphatic monocarboxylic acid having a carbon number of 7 to 9 is greater than 70% by weight of the total carboxylic acid content.

As stated above, it is desirable that esters of dihydric, trihydric and higher polyhydric neopentylpolyol contain 2-methylhexanoic acid as a carboxylic acid component in an amount exceeding the specified level, but 2-methylhexanoic acid may be the entire content of carboxylic acid component. Examples include an ester comprising neopentyl glycol and 2-methylhexanoic acid and an ester comprising trimethylolpropane and/or pentaerythritol and 2-methylhexanoic acid. The entire carboxylic acid component may be a mixed acid comprising saturated branched aliphatic monocarboxylic acids having a carbon number of 7 to 9 including 2-methylhexanoic acid. Examples of such mixed acids include mixed acids comprising two or more saturated branched aliphatic monocarboxylic acids, such as a mixed acid comprising a saturated branched aliphatic monocarboxylic acid having a carbon number of 7 and a saturated branched aliphatic monocarboxylic acid having a carbon number of 8, a mixed acid comprising two saturated branched aliphatic monocarboxylic acids having a carbon number of 7 or 9, respectively, a mixed acid comprising three saturated branched aliphatic monocarboxylic acids having a carbon number of 7, 8 or 9, respectively, and a mixed acid comprising a saturated branched aliphatic monocarboxylic acid having a carbon number of 7 and two saturated branched aliphatic monocarboxylic acids having a carbon number of 8. It is preferable, however, that at least 2-methylhexanoic acid be contained in an amount exceeding the specified level in any case, as stated above. Examples include mixed acids comprising two acids, such as a mixed acid comprising 2-methylhexanoic acid and 2-ethylhexanoic acid, a mixed acid comprising 2-methylhexanoic acid and 3,5-dimethylhexanoic acid and a mixed acid comprising 2-methylhexanoic acid and 3,5,5-trimethylhexanoic acid, and mixed acids comprising three acids such as a mixed acid comprising 2-methylhexanoic acid, 2-ethylhexanoic acid and 3,5-dimethylhexanoic acid.

On the other hand, when these saturated branched aliphatic monocarboxylic acids having a carbon number of 7 to 9 including 2-methylhexanoic acid do not form the entire carboxylic acid component, the remaining carboxylic acid moiety may be any monocarboxylic acid, whether linear or branched. It is preferable, however, that the remaining carboxylic acid moiety be a branched monocarboxylic acid, and the entire carboxylic acid have a branched structure. When a linear monocarboxylic acid is used, its content is preferably not more than 20% by weight, more preferably not more than 10% by weight of the total carboxylic acid content. If it is used in excess of 20% by weight, the compatibility with hydrofluorocarbons becomes poor and the hydrolysis resistance becomes considerably poor. Also, the carbon number of the monocarboxylic acid used in the remaining carboxylic acid moiety, other than the 2-methylhexanoic acid and saturated branched aliphatic monocarboxylic acids having a carbon number of 7 to 9, is preferably 5 to 12, more preferably 7 to 9. The use of a monocarboxylic acid having a carbon number exceeding 12 or under 5 is undesirable, since the compatibility with hydrofluorocarbons becomes poor in the former case, and since the metal corrosivity can increase in the latter case.

The range of viscosity of the above-mentioned ester obtained from alcohol and acid is normally from 5 to 115 cst, preferably from 5 to 56 cst as of kinematic viscosity at 40° C. Kinematic viscosities at 40° C. under 5 cst or over 115 cst are undesirable, since the lubricity becomes poor in the former case, and since the compatibility becomes poor in the latter case. To obtain an ester having a viscosity in this range, these two or more esters are mixed or two or more acids are reacted with alcohol, whereby an ester of the desired viscosity grade can be obtained.

For example, an ester of VG5 (viscosity at 40° C. is 5 cst) is neopentyl glycol di-(2-methylhexanate).

An ester of VG8 is neopentyl glycol di-2-ethylhexanate or can be obtained by mixing neopentyl glycol di-2-methylhexanate and trimethylolpropane tri-2-methylhexanate in a weight ratio of about 60 to 40 or by reacting a mixed carboxylic acid comprising 2-methylhexanoic acid and 3,5,5-trimethylhexanoic acid in a weight ratio of about 60 to 40 with neopentyl glycol.

An ester of VG15 is trimethylolpropane tri-2-methylhexanate or can be obtained by mixing neopentyl glycol di-3,5,5-trimethylhexanate and pentaerythritol tetra-3,5,5-trimethylhexanate in a weight ratio of about 90 to 10, or by mixing neopentyl glycol di-3,5-dimethylhexanate and trimethylolpropane tri-3,5-dimethylhexanate in a weight ratio of about 50 to 50 or by mixing neopentyl glycol di-2-methylhexanate and trimethylolpropane tri-3,5,5-trimethylhexanate in a weight ratio of about 55 to 45.

An ester of VG22 can be obtained by mixing trimethylolpropane tri-2-methylhexanate and pentaerythritol tetra-2-methylhexanate in a weight ratio of about 40 to 60, or by mixing neopentyl glycol di-3,5,5-trimethylhexanate and pentaerythritol tetra-3,5,5-trimethylhexanate in a weight ratio of about 75 to 25, or by mixing neopentyl glycol di-3,5,5-trimethylhexanate and trimethylolpropane tri-3,5,5-trimethylhexanate in a weight ratio of about 65 to 35, or by reacting a mixed carboxylic acid comprising 2-methylhexanoic acid and 3,5,5-trimethylhexanoic acid in a weight ratio of about 70 to 30 with trimethylolpropane, or by mixing trimethylolpropane tri-2-methylhexanate and pentaerythritol tetra-3,5,5-trimethylhexanate in a weight ratio of about 80 to 20, or by reacting a mixed carboxylic acid comprising 2-methylhexanoic acid and 2-ethylhexanoic acid in a weight ratio of about 20 to 80 with trimethylolpropane or by reacting a mixed carboxylic acid comprising 2-methylhexanoic acid and 3,5-dimethylhexanoic acid in a weight ratio of about 45 to 55 with trimethylolpropane.

An ester of VG32 can be obtained by mixing neopentyl glycol di-3,5,5-trimethylhexanate and pentaerythritol tetra-3,5,5-trimethylhexanate in a weight ratio of about 60 to 40, or by mixing neopentyl glycol di-3,5,5-trimethylhexanate and trimethylolpropane tri-3,5,5-trimethylhexanate in a weight ratio of about 35 to 65, or by reacting a mixed carboxylic acid comprising 2-methylhexanoic acid and 3,5,5-trimethylhexanoic acid in a weight ratio of about 35 to 65 with trimethylolpropane, or by reacting a mixed carboxylic acid comprising 2-methylhexanoic acid and 3,5-dimethylhexanoic acid in a weight ratio of about 80 to 20 with pentaerythritol, or by reacting a mixed carboxylic acid comprising 2-methylhexanoic acid and 3,5,5-trimethylhexanoic acid in a weight ratio of about 90 to 10 with pentaerythritol, or by reacting a mixed carboxylic acid comprising 2-ethylhexanoic acid and 3,5,5-trimethylhexanoic acid in a weight ratio of about 65 to 35 with trimethylolpropane, or by reacting a mixed carboxylic acid comprising 2-methylhexanoic acid and 2-ethylhexanoic acid in a weight ratio of about 60 to 40 with pentaerythritol, or by reacting a mixed carboxylic acid comprising 2-methylhexanoic acid and 3,5-dimethylhexanoic acid in a weight ratio of about 80 to 20 with pentaerythritol, or from trimethylolpropane tri-3,5-dimethylhexanate.

An ester of VG56 is trimethylolpropane tri-3,5,5-trimethylhexanate or can be obtained by mixing neopentyl glycol di-3,5,5-trimethylhexanate and pentaerythritol tetra-3,5,5-trimethylhexanate in a weight ratio of 35 to 65, or by reacting a mixed carboxylic acid comprising 2-methylhexanoic acid and 3,5,5-trimethylhexanoic acid in a weight ratio of about 50 to 50 with pentaerythritol or by reacting a mixed carboxylic acid comprising 2-ethylhexanoic acid and 3,5,5-trimethylhexanoic acid in a weight ratio of about 75 to 25 with trimethylolpropane. It should be noted, however, that the ester for the present invention is not limited to the examples given above.

As stated above, various esters of different viscosity grades can be obtained; however, in view of the compatibility with HFC134a and hydrolysis resistance, the best are (A) esters obtained from neopentyl glycol, trimethylolpropane or pentaerythritol and 2-methylhexanoic acid and/or mixtures of these esters, or (B) esters obtained from a mixed acid comprising 2-methylhexanoic acid and 3,5,5-trimethylhexanoic acid and trimethylolpropane or pentaerythritol. Type A yields esters of VG5 through VG22, while type B yields esters of VG22 through VG56.

An ester for the present invention can be obtained by ordinary reaction of esterification or ester exchange from a combination of one or more neopentylpolyols described above and one or more saturated branched aliphatic monocarboxylic acids described above or their lower alkyl esters, acid anhydrides and other derivatives. In this case, it is preferable that the acid value of the obtained ester be as low as possible, normally at not more than 0.1 mg KOH/g, preferably not more than 0.05 mg KOH/g. Acid values exceeding 0.1 mg KOH/g are undesirable, since the metal corrosivity can increase.

The hydroxyl value of the ester for the present invention is normally not less than 1 mg KOH/g and not more than 50 mg KOH/g, preferably not less than 1 mg KOH/g and not less than 30 mg KOH/g, and more preferably not less than 2 mg KOH/g and not less than 20 mg KOH/g. Hydroxyl values exceeding 50 mg KOH/g or under 1 mg KOH/g are undesirable, since the hygroscopicity becomes excessive in the former case, and since the wear resistance becomes poor in the latter case.

The working fluid comprising a composition containing a hydrofluorocarbon and the ester described above accomplishes the object of the present invention sufficiently.

However, hydrofluorocarbon-ester systems are more liable to absorb moisture because of the increased polarity of hydrofluorocarbon and oil in comparison with CFC12-mineral oil systems, which constitute conventional working fluids. Although refrigerating machines are equipped with a dryer for removing water through a molecular sieve, the water which remains unremoved can hydrolyze the ester to form carboxylic acid. It is feared that the resulting carboxylic acid may corrode metals to cause wear and copper plating. For this reason, it is desirable to add a certain kind of epoxy compound to prevent the carboxylic acid from having an adverse effect.

In the systems of CFC12 or HCFC22, both of which contains a chlorine atom, the chlorofluorocarbon decomposes to produce hydrochloric acid; to trap the hydrochloric acid, various epoxy compounds such as phenylglycidyl ether type epoxy compounds, epoxidated monoesters of fatty acid and epoxidated vegetable oils are added to naphthenic oil and other oils. As disclosed in Japanese Patent Laid-Open No. 63395/1982, a compound having an epoxycycloalkyl group such as epoxycyclooctane is added to polyether compound to prevent the deterioration of the polyether compound by hydrochloric acid.

However, because the acid resulting from a composition of a hydrofluorocarbon and the ester described above in the present invention is not a strong acid like hydrochloric acid but mainly a saturated branched aliphatic monocarboxylic acid having a carbon number of 7 to 9, the above-mentioned ordinary epoxy compounds have no significant effect. The inventors found that the addition of a compound having an epoxycyclohexyl group and/or a compound having an epoxycyclopentyl group is very effective in the present invention.

The compound having an epoxycyclohexyl group and compound having an epoxycyclopentyl group used for the present invention have a carbon number of 5 to 40, preferably 5 to 25. Examples of such compounds include 1,2-epoxycyclohexane, 1,2-epoxycyclopentane, bis(3,4-epoxycyclohexylmethyl)adipate, bis(3,4-epoxy-6-methylcyclohexylmethyl)adipate, 3,4-epoxycyclohexylmethyl-3,4-epoxycyclohexanecarboxylate, exo-2,3-epoxynorbornane, 2-(7-oxabicyclo[4.1.0]hepto-3-yl)-spiro(1,3-dioxane-5,3'-[7]oxabicyclo[4.1.0]heptane), 4-epoxyethyl-1,2-epoxycyclohexane and 4-(1'-methylepoxyethyl)-1,2-epoxy-2-methylcyclohexane.

Although there is no limitation, 1,2-epoxycyclohexane, 1,2-epoxycyclopentane, bis(3,4-epoxycyclohexylmethyl)adipate, bis(3,4-epoxy-6-methylcyclohexylmethyl)adipate, 3,4-epoxycyclohexylmethyl-3,4-epoxycyclohexanecarboxylate and 2-(7-oxabicyclo[4.1.0]hepto-3-yl)-spiro(1,3-dioxane-5,3'-[7]oxabicyclo[4.1.0]heptane) are preferred.

In the present invention, these compounds having an epoxycyclohexyl group may be used singly or in combination, and the compounds having an epoxycyclopentyl group may be used singly or in combination. A compound having an epoxycyclohexyl group and a compound having an epoxycyclopentyl group may be used in combination. The amount of these compounds added is normally 0.05 to 2.0 parts by weight, preferably 0.1 to 1.5 parts by weight, and more preferably 0.1 to 1.0 part by weight to 100 parts by weight of the ester for the present invention.

For the purpose of improving the lubricity or protecting the metal surface from corrosion by carboxylic acid, it is effective to add triaryl phosphate and/or triaryl phosphite. For the purpose of preventing copper plating, it is effective to add benzotriazole and/or a benzotriazole derivative. For the purpose of improving the thermal stability, it is effective to add metal deactivator capable of chelating.

The triaryl phosphate or triaryl phosphite used for the present invention has a carbon number of 18 to 70, preferably 18 to 50. Examples thereof include triaryl phosphates such as triphenyl phosphate, tricresyl phosphate, trixylenyl phosphate, cresyldiphenyl phosphate, xylenyldiphenyl phosphate, tris(tribromophenyl) phosphate, tris(dibromophenyl) phosphate, tris(2,4-di-t-butylphenyl) phosphate and trinonylphenyl phosphate, and triaryl phosphites such as triphenyl phosphite, tricresyl phosphite, trixylenyl phosphite, cresyldiphenyl phosphite, xylenyldiphenyl phosphite, tris(2,4-di-t-butylphenyl) phosphite, trinonylphenyl phosphite, tris(tribromophenyl) phosphite and tris(dibromophenyl) phosphite, with preference given to triphenyl phosphate, tricresyl phosphate, trixylenyl phosphate, tris(2,4-di-t-butylphenyl) phosphate, triphenyl phosphite, tricresyl phosphite, trixylenyl phosphite and tris(2,4-di-t-butylphenyl) phosphite.

The amount of triaryl phosphate and/or triaryl phosphite added is normally 0.1 to 5.0 parts by weight, preferably 0.5 to 2.0 parts by weight to 100 parts by weight of the ester for the present invention.

The amount of benzotriazole and/or benzotriazole derivative added for the present invention is normally 0.001 to 0.1 part by weight, preferably 0.003 to 0.03 part by weight to 100 parts by weight of the ester for the present invention. Also, the benzotriazole and/or benzotriazole derivative used for the present invention has a carbon number of 6 to 50, preferably 6 to 30. Examples thereof include benzotriazole, 5-methyl-1H-benzotriazole, 1-dioctylaminomethylbenzotriazole, 1-dioctylaminomethyl-5-methylbenzotriazole, 2-(5'-methyl-2'-hydroxyphenyl)benzotriazole, 2-[2'-hydroxy-3',5'-bis(α,α-dimethylbenzyl)phenyl]2H-benzotriazole, 2-(3',5'-di-t-butyl-2'-hydroxyphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-(3',5'-di-t-amyl-2'-hydroxyphenyl)benzotriazole, 2-(5'-t-butyl-2'-hydroxyphenyl)benzotriazole, 2-(2'-hydroxy-5'-methylphenyl)benzotriazole, 2-(2'-hydroxy-5'-t-octylphenyl)benzotriazole and 2-[2'-hydroxy-3'-(3'',4'',5'',6''-tetrahydrophthalimidomethyl)-5'-methylphenyl]benzotriazole, with preference given to benzotriazole, 5-methyl-1H-benzotriazole and others.

The amount of metal deactivator added for the present invention is normally 0.001 to 2.0 parts by weight, preferably 0.003 to 0.5 part by weight to 100 parts by weight of the ester for the present invention. The metal deactivator used for the present invention is preferably capable of chelating and has a carbon number of 5 to 50, preferably 5 to 20. Examples thereof include N,N'-disalicylidene-1,2-diaminoethane, N,N'-disalicylidene-1,2-diaminopropane, N-salicylidene-N'-dimethyl-1,2-diaminoethane, N,N'-salicylidenehydrazine, N,N'-bis-(α,5-dimethylsalicylidene)-1,2-diaminoethane, N,N'-bis-(α,5-dimethylsalicylidene)-1,3-propanediamine, N,N'-bis(α,5-dimethylsalicylidene)-1,6-hexanediamine, N,N'-bis(α,5-dimethylsalicylidene)-1,10-decanediamine, N,N'-bis(α,5-dimethylsalicylidene)ethylenetetramine, salicylaldoxime, 2-hydroxy-5-methylacetophenoxime, acetylacetone, ethyl acetoacetate, 2-ethylhexyl acetoacetate, dimethyl malonate, diethyl malonate, 2-ethylhexyl malonate, anthranilic acid, nitrilotriacetic acid, dihydroxyethylglycine, hydroxyethylethylenediaminetriacetic acid, hydroxyethyliminodiacetic acid, ethylenediamine, 3-mercapto-1,2-propanediol, alizarin, quinizarin, mercaptobenzothiazole and others, with preference given to N,N'-disalicylidene-1,2-diaminoethane, N,N'-disalicylidene-1,2-diaminopropane, acetylacetone, acetoacetates, alizarin, quinizarin and others.

In addition to the additives shown above, commonly used lubricating oil additives such as extreme-pressure additives, oiliness improvers and defoaming agents may be added as necessary.

Examples of substances which can be used as extreme-pressure additives or oiliness improvers include zinc compounds such as zinc dialkyl dithiophosphate and zinc diaryl dithiophosphate, sulfur compounds such as thiodipropionate, dialkyl sulfide, dibenzyl sulfide, dialkyl polysulfide, alkyl mercaptan, dibenzothiophene and 2,2'-dithiobis(benzothiazole), phosphorus compounds such as trialkyl phosphite and trialkyl phosphate, chlorine compounds such as chlorinated paraffin, molybdenum compounds such as molybdenum dithiocarbamate, molybdenum dithiophosphate and molybdenum disulfide, fluorine compounds such as perfluoroalkyl polyether, trifluorochloroethylene polymer and graphite fluoride, silicon compounds such as fatty acid denatured silicone, and graphite.

Examples of substances which can be used as defoaming agents include silicone oils such as dimethylpolysiloxane and organosilicates such as diethyl silicate.

An additive which stabilizes hydrofluorocarbon refrigerant such as an organic tin compound or boron compound may also be added.

The working fluid composition for refrigerating machine of the present invention can easily be prepared by mixing a hydrofluorocarbon and the above-mentioned ester for the invention or oil comprising the ester and an additive by a conventional method. The mixing ratio is normally 5/1 to 1/10, preferably 2/1 to 1/5 (weight ratio) as of the ratio of HFC134a and oil.

The hydrofluorocarbon used for the present invention includes 1,1,1,2-tetrafluoroethane (HFC134a), 1,1,2,2-tetrafluoroethane (HFC134), 1,1-difluoroethane (HFC152a), 1,1,1-trifluoroethane (HFC143a), pentafluoroethane (HFC125) and difluoromethane (HFC32), with preference given to 1,1,1,2-tetrafluoroethane.

The working fluid composition for refrigerating machine of the present invention thus obtained, which contains a hydrofluorocarbon and an ester or an oil comprising an ester and an additive, is excellent in compatibility, lubricity, thermal stability and insulating property.

EXAMPLES

The present invention is hereinafter described in more detail by means of the following working examples and comparative examples, but the invention is not limited by these examples.

EXAMPLE 1

To a 1-liter four-necked flask were attached a stirrer, a thermometer, a nitrogen sparging tube and a dehydrating tube with a condenser. 104 g (1.0 mol) of neopentyl glycol and 260 g (2.0 mol) of 2-methylhexanoic acid were placed in the flask, and esterification was carried out in nitrogen stream at 240° C. for 10 hours to yield an ester A. Using the alcohols and carboxylic acids listed in Tables 1 and 2, the same reaction as above was carried out to yield esters B through T and esters a through d.

From the esters A through T and mixtures thereof, oils 1 through 21 for the present invention listed in Tables 3 and 4 were obtained. Comparative oils 1 through 8 comprising the esters a through d and other oils are also listed in Table 4.

The kinematic viscosity at 40° C. and 100° C. and viscosity index (JIS K-2283) were determined of these oils 1 through 21 for the present invention and comparative oils 1 through 8. Pour point (JIS K-2269) was also determined. The results are shown in Tables 3 and 4.

Of the esters for the present invention, esters of 2-ethylhexanoic acid (oils 2 and 19 for the invention) are considerably inferior to the others in viscosity index and low temperature fluidity.

Table 5 shows the composition of oils 22 through 35 for the present invention prepared by adding an additive to these esters and comparative oils 9 and 10. The figures in Table 5 are the amount (parts by weight) of additive per 100 parts by weight of the ester. The additives 1 through 11 are as follows:

(1) 1,2-epoxycyclopentane
(2) 1,2-epoxycyclohexane
(3) 2-(7-oxabicyclo[4.1.0]hepto-3-yl)-spiro(1,3-dioxane-5,3'-[7]oxabicyclo[4.1.0]heptane
(4) Bis(3,4-epoxycyclohexylmethyl)adipate
(5) Phenylglycidyl ether
(6) 2-ethylhexylglycidyl ether
(7) Tricresyl phosphate
(8) Trixylenyl phosphate
(9) Tricresyl phosphite
(10) Benzotriazole
(11) Acetylacetone.

TABLE 1

| Ester | Alcohol | Carboxylic Acid (Weight Ratio) | Viscosity (cst) 40° C. | Viscosity (cst) 100° C. |
|---|---|---|---|---|
| A | Neopentyl glycol | 2-methylhexanoic acid | 5.24 | 1.74 |
| B | Neopentyl glycol | 2-ethylhexanoic acid | 7.35 | 2.01 |
| C | Neopentyl glycol | 3,5,5-trimethylhexanoic acid | 13.1 | 3.14 |
| D | Trimethylolpropane | 2-methylhexanoic acid | 14.7 | 3.33 |
| E | Trimethylolpropane | 3,5-dimethylhexanoic acid | 30.1 | 5.09 |
| F | Trimethylolpropane | 3,5,5-trimethylhexanoic acid | 51.9 | 7.13 |
| G | Trimethylolpropane | 2-methylhexanoic acid/ 3,5,5-trimethylhexanoic acid (70/30) | 21.3 | 4.20 |
| H | Pentaerythritol | 2-methylhexanoic acid | 26.8 | 4.89 |
| I | Pentaerythritol | 3,5,5-trimethylhexanoic acid | 114.1 | 11.5 |
| J | Pentaerythritol | 2-methylhexanoic acid/ 3,5-dimethylhexanoic acid (80/20) | 29.6 | 5.22 |
| K | Pentaerythritol | 2-methylhexanoic acid/ 3,5,5-trimethylhexanoic acid (50/50) | 54.3 | 7.41 |
| L | Neopentyl glycol | 2-methylhexanoic acid/ 3,5,5-trimethylhexanoic acid (50/50) | 8.41 | 2.37 |

TABLE 2

| Ester | Alcohol | Carboxylic Acid (Weight Ratio) | Viscosity (cst) 40° C. | Viscosity (cst) 100° C. |
|---|---|---|---|---|
| M | Trimethylolpropane | 2-methylhexanoic acid/ 2-ethylpentanoic acid/ 3,5,5-trimethylhexanoic acid (25/10/65) | 32.0 | 5.31 |
| N | Trimethylolpropane | 2-methylhexanoic acid/ 3,5,5-trimethylhexanoic acid/ 2-heptylundecanoic acid (35/30/35) | 34.6 | 5.98 |
| O | Pentaerythritol | 2-methylhexanoic acid/ 3,5-dimethylhexanoic acid (10/90) | 54.3 | 7.41 |
| P | Pentaerythritol | 2-methylhexanoic acid/ dimethyloctanoic acid (50/50) | 57.8 | 7.68 |
| Q | Pentaerythritol | 2-methylhexanoic acid/ 2-ethylhexanoic acid (60/40) | 33.4 | 5.51 |

TABLE 2-continued

| Ester | Alcohol | Carboxylic Acid (Weight Ratio) | Viscosity (cst) 40° C. | Viscosity (cst) 100° C. |
|---|---|---|---|---|
| R | Pentaerythritol | 2-ethylhexanoic acid | 44.8 | 6.39 |
| S | Pentaerythritol | 2-methylhexanoic acid/ 3,5,5-trimethylhexanoic acid/ octanoic acid (80/10/10) | 31.6 | 5.41 |
| T | Pentaerythritol | 2-methylhexanoic acid/ octanoic acid (70/30) | 26.8 | 5.06 |
| a | Neopentyl glycol | octanoic acid | 6.94 | 2.19 |
| b | Trimethylolpropane | nonanoic acid | 20.6 | 4.62 |
| c | Pentaerythritol | heptanoic acid/ octanoic acid (80/20) | 24.6 | 5.14 |
| d | Neopentyl glycol | 2-heptylundecanoic acid | 28.0 | 5.27 |

TABLE 3

| Kind of Oil (Weight Ratio) | Viscosity (cst) 40° C. | Viscosity (cst) 100° C. | Viscosity Index | Pour Point (°C.) |
|---|---|---|---|---|
| Oil for Present Invention | | | | |
| 1 Ester A | 5.24 | 1.71 | — | −55> |
| 2 Ester B | 7.35 | 2.01 | 43 | −55> |
| 3 Ester A/Ester D (60/40) | 7.81 | 2.24 | 91 | −55> |
| 4 Ester D | 14.7 | 3.33 | 97 | −55> |
| 5 Ester C/Ester I (90/10) | 15.0 | 3.39 | 96 | −55> |
| 6 Ester D/Ester H (40/60) | 21.0 | 4.21 | 103 | −55> |
| 7 Ester G | 21.3 | 4.20 | 99 | −55> |
| 8 Ester E | 30.1 | 5.09 | 94 | −55> |
| 9 Ester J | 29.6 | 5.22 | 107 | −55> |
| 10 Ester C/Ester F (35/65) | 31.8 | 5.34 | 100 | −55> |
| 11 Ester F | 51.9 | 7.13 | 94 | −55> |
| 12 Ester K | 54.3 | 7.41 | 96 | −55> |
| 13 Ester L | 8.41 | 2.37 | 96 | −55> |
| 14 Ester M | 32.0 | 5.31 | 102 | −55> |
| 15 Ester N | 34.6 | 5.98 | 118 | −55> |

TABLE 4

| Kind of Oil (Weight Ratio) | Viscosity (cst) 40° C. | Viscosity (cst) 100° C. | Viscosity Index | Pour Point (°C.) |
|---|---|---|---|---|
| Oil for Present Invention | | | | |
| 16 Ester O | 54.3 | 7.41 | 96 | −55> |
| 17 Ester P | 57.8 | 7.68 | 95 | −55> |
| 18 Ester Q | 33.4 | 5.51 | 100 | −55> |
| 19 Ester R | 44.8 | 6.39 | 88 | −7.5 |
| 20 Ester S | 31.6 | 5.41 | 105 | −55> |
| 21 Ester T | 26.8 | 5.06 | 117 | −55> |
| Comparative Oil | | | | |
| 1 Ester a | 6.94 | 2.19 | 126 | −20 |
| 2 Ester b | 20.6 | 4.62 | 146 | −15 |
| 3 Ester c | 24.6 | 5.14 | 144 | 5 |
| 4 Ester d | 28.0 | 5.27 | 122 | −55> |
| 5 Naphthenic oil | 30.0 | 4.44 | 14 | −42.5 |
| 6 Polyα-olefin | 29.9 | 5.68 | 133 | −55> |
| 7 Poly (oxyethyleneoxypropylene) glycol monobutyl ether | 20.3 | 4.83 | 170 | −55 |
| 8 Polyoxypropylene glycol di-2-ethylhexanate | 18.3 | 3.95 | 111 | −55> |

TABLE 5

| | Oil for Present Invention | | | | | | | | | | | | | | Comparative Oil | |
|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 35 | 9 | 10 |
| Ester (Weight Ratio) | D | A/D (60/40) | G | J | D/H (40/60) | G | D | G | D/H (40/60) | G | D | G | D/H (40/60) | G | G | D/H (40/60) |
| Epoxy Compound | | | | | | | | | | | | | | | | |
| (1) | 0.25 | | | 0.5 | | | 0.25 | | | | 0.25 | | | | | |
| (2) | | 0.25 | 0.5 | | | | | 0.5 | | | | 0.5 | | | | |
| (3) | | | | | 0.5 | | | | 0.5 | 0.5 | | | 0.5 | | | |
| (4) | | | | | | 0.5 | | | | | | | | 0.5 | | |
| (5) | | | | | | | | | | | | | | | 0.5 | |
| (6) | | | | | | | | | | | | | | | | 0.5 |
| Triaryl phosphate | | | | | | | | | | | | | | | | |
| (7) | | | | | | | 1.0 | 1.0 | | | | | | | | |
| (8) | | | | | | | | | 1.0 | | | | 1.0 | | | |
| Triaryl phosphite | | | | | | | | | | | | | | | | |
| (9) | | | | | | | | | | 1.0 | | | | | | |
| Benzotriazol (10) | | | | | | | | | | | 0.005 | 0.005 | 0.005 | | | |
| Metal Deactivator (11) | | | | | | | | | | | | | | 0.1 | | |

EXAMPLE 2

To determine the compatibility of the inventive products 1 through 35 and comparative products 1 through 8, all of which comprise one of the oils obtained in Example 1 (oils 1 through 35 for the present invention and comparative oils 1 through 8, respectively) and 1,1,1,2-tetrafluoroethane (HFC134a), the two-phase separation temperature for 1,1,1,2-tetrafluoroethane at low and high temperatures was measured at a sample concentration of 10 vol %. For the comparative products whose low-temperature two-phase separation temperature exceeded 0° C., the high-temperature separation temperature was not measured. The results are shown in Tables 6, 7 and 8.

As is evident from Tables 6, 7 and 8, the inventive products surpass the comparative products 1 through 3, all of which comprise an ester of linear monocarboxylic acid and HFC134a, in compatibility (e.g., inventive product 2 versus comparative product 1, inventive product 11 versus comparative product 2, inventive product 9 versus comparative product 3). The comparative product 4, a composition of an ester of a branched carboxylic acid with high carbon number and HFC134a, had poor compatibility. The comparative products 5 and 6, both of which comprise a conventional oil (naphthenic oil or polyα-olefin) and HFC134a, also had poor compatibility. The inventive products 22 through 35, containing an additive, had excellent compatibility.

Of the inventive products, those containing a ester of trihydric and higher polyhydric neopentylpolyol wherein the 2-methylhexanoic acid content is less than 25% by weight to the total carboxylic acid content (inventive products 16 and 19) and those wherein the 2-methylhexanoic acid content is not less than 25% by weight to the total carboxylic acid content but the content of saturated branched aliphatic monocarboxylic acids having a carbon number of 7 to 9 is less than 70% by weight to the total carboxylic acid content (inventive products 15 and 17) had poor compatibility with HFC134a. The products incorporating a linear monocarboxylic acid (inventive products 20 and 21) were less compatible with HFC134a than the products wherein the ester comprised branched monocarboxylic acids alone as acid component, with considerably poor compatibility noted when the linear monocarboxylic acid content exceeded 20% by weight (inventive product 21).

TABLE 6

| Present Inventive Product | Low-Separation Temperature (°C.) | High-Separation Temperature (°C.) |
|---|---|---|
| 1 | −60> | 70< |
| 2 | −60> | 70< |
| 3 | −60> | 70< |
| 4 | −60> | 70< |
| 5 | −60> | 70< |
| 6 | −60> | 70< |
| 7 | −60> | 70< |
| 8 | −40 | 70< |
| 9 | −48 | 70< |
| 10 | −60> | 70< |
| 11 | −52 | 70< |
| 12 | −45 | 70< |
| 13 | −60> | 70< |
| 14 | −56 | 70< |
| 15 | −10 | 70< |
| 16 | −22 | 70< |
| 17 | −15 | 70< |
| 18 | −40 | 70< |

TABLE 7

| Present Inventive Product | Low-Separation Temperature (°C.) | High-Separation Temperature (°C.) |
|---|---|---|
| 19 | −25 | 70< |
| 20 | −34 | 70< |
| 21 | −13 | 70< |
| 22 | −60> | 70< |
| 23 | −60> | 70< |
| 24 | −60> | 70< |
| 25 | −48 | 70< |
| 26 | −60> | 70< |
| 27 | −60> | 70< |
| 28 | −60> | 70< |
| 29 | −60> | 70< |
| 30 | −60> | 70< |
| 31 | −60> | 70< |
| 32 | −60> | 70< |
| 33 | −60> | 70< |
| 34 | −60> | 70< |

TABLE 7-continued

| Present Inventive Product | Low-Separation Temperature (°C.) | High-Separation Temperature (°C.) |
|---|---|---|
| 35 | −60> | 70< |

TABLE 8

| Comparative Oil | Low-Separation Temperature (°C.) | High-Separation Temperature (°C.) |
|---|---|---|
| 1 | −43 | 70< |
| 2 | 30< | no determination |
| 3 | 20 | no determination |
| 4 | 30< | no determination |
| 5 | 30< | no determination |
| 6 | 30< | no determination |
| 7 | −60> | 70< |
| 8 | −60> | 70< |

EXAMPLE 3

With respect to the inventive products 1 through 35 and the comparative products 1 through 3, 9 and 10, a sealed tube test was carried out under the following conditions to determine their hydrolysis resistance.

10 g of oil and 5 g of HFC134a were placed in a glass tube, and water was added at 3000 ppm, relative to the oil. After adding iron, copper and aluminum as catalysts, the glass tube was sealed and tested at 175° C. for 14 days. Then, the glass tube was unsealed, and the acid value of the oil was determined after removing HFC134a. The results are shown in Table 9.

As is evident from Table 9, the inventive products 1 through 21 are markedly superior to the comparative products 1 through 3, all of which incorporate an ester of linear carboxylic acid, in hydrolysis resistance. Of the inventive products, those containing a ester of dihydric neopentylpolyol wherein the 2-methylhexanoic acid content is not less than 70% by weight to the total carboxylic acid content (inventive products 1 and 3) and those containing a ester of trihydric and higher polyhydric neopentylpolyol wherein the 2-methylhexanoic acid content is not less than 25% by weight to the total carboxylic acid content and the content of saturated branched aliphatic monocarboxylic acids having a carbon number of 7 to 9 is not less than 70% by weight of the total carboxylic acid content (inventive products 4, 6, 7, 9, 12, 14 and 18) were particularly excellent. The products incorporating a linear monocarboxylic acid (inventive products 20 and 21) were less resistant to hydrolysis, with considerably poor hydrolysis resistance noted when the linear monocarboxylic acid content exceeded 20% by weight (inventive product 21). The compositions incorporating an oil containing a compound having an epoxycyclopentyl group or epoxycyclohexyl group (inventive products 22 through 35) were considerably lower in acid value in comparison with the compositions incorporating an oil containing phenylglycidyl ether or 2-ethylhexylglycidyl ether (comparative products 9 and 10), and had a preventive effect on the formation of carboxylic acid.

TABLE 9

| Present Inventive Product | Increase of Acid Value (mgKOH/g) |
|---|---|
| 1 | 0.3 |
| 2 | 0.2 |
| 3 | 0.4 |

TABLE 9-continued

| | Increase of Acid Value (mgKOH/g) |
|---|---|
| 4 | 0.3 |
| 5 | 2.4 |
| 6 | 0.3 |
| 7 | 0.9 |
| 8 | 2.7 |
| 9 | 1.6 |
| 10 | 2.3 |
| 11 | 2.5 |
| 12 | 1.0 |
| 13 | 2.0 |
| 14 | 1.1 |
| 15 | 0.8 |
| 16 | 2.5 |
| 17 | 1.2 |
| 18 | 0.2 |
| 19 | 0.3 |
| 20 | 3.2 |
| 21 | 5.3 |
| Present Invention Product | |
| 22 | 0.05> |
| 23 | 0.05> |
| 24 | 0.05> |
| 25 | 0.05> |
| 26 | 0.05> |
| 27 | 0.05> |
| 28 | 0.05> |
| 29 | 0.05> |
| 30 | 0.05> |
| 31 | 0.05> |
| 32 | 0.05> |
| 33 | 0.05> |
| 34 | 0.05> |
| 35 | 0.05> |
| Comparative Product | |
| 1 | 7.2 |
| 2 | 7.3 |
| 3 | 7.2 |
| 9 | 0.4 |
| 10 | 0.3 |

EXAMPLE 4

To determine the wear resistance of the oils 1 through 21 and 28 through 31 for the inventive products and the comparative oils 5 through 8 for the comparative products, samples having a hydroxyl value of less than 1 mg KOH/g and samples having a hydroxyl value of not less than 1 mg KOH/g were prepared for each oil and subjected to a Falex test. The esters having a hydroxyl value of not less than 1 mg KOH/g were prepared by reducing the relative equivalent of carboxylic acid to alcohol. For example, the ester A, having a hydroxyl value of 10.5 mg KOH/g, was obtained by placing 104 g (1.0 mol) of neopentyl glycol and 252.2 g (1.94 mol) of 2-methylhexanoic acid in a flask and carrying out reaction in the same manner as in Example 1.

The Falex test was carried out as follows: While blowing 1,1,1,2-tetrafluoroethane (HFC134a) into oil at a rate of 150 cc per minute, the pin was rotated under no load for 10 minutes, subsequently subjected to preliminary rotation under a load of 200 lb for 5 minutes and then rotated under a load of 350 for 60 minutes. After this operation, the amounts of wear in the V block and pin were determined. The results are shown in Table 10.

As is evident from Table 10, the inventive products were found to be more resistant to wear than the compositions of a conventional oil (naphthenic oil or polyα-olefin) (comparative products 5 and 6) and the compositions of a polyether compound (comparative products 7 and 8). Of the esters of the present invention, those having a hydroxyl value of not less than 1 mg KOH/g were more resistant to wear than those having a hydroxyl value of less than 1 mg KOH/g in wear resistance.

The products containing triaryl phosphate or triaryl phosphite (inventive products 28 through 31) had markedly improved wear resistance.

In the evaluation of esters in Examples 1 through 3 given above and Examples 5 through 7 given below, there was no difference in effectiveness between the esters having a hydroxyl value of less than 1 mg KOH/g and those having a hydroxyl value of not less than 1 mg KOH/g, with a difference noted in wear resistance alone.

TABLE 10

| | Hydroxyl Value (mgKOH/g) | Amounts of Wear (mg) | Hydroxyl Value (mgKOH/g) | Amounts of Wear (mg) |
|---|---|---|---|---|
| Oil for Present Invention | | | | |
| 1 | 1> | 33.4 | 10.5 | 24.3 |
| 2 | 1> | 32.3 | 9.2 | 25.5 |
| 3 | 1> | 30.1 | 5.8 | 26.0 |
| 4 | 1> | 29.6 | 8.5 | 19.9 |
| 5 | 1> | 20.4 | 2.1 | 18.0 |
| 6 | 1> | 23.5 | 4.3 | 18.6 |
| 7 | 1> | 21.4 | 5.0 | 16.1 |
| 8 | 1> | 24.2 | 13.0 | 14.3 |
| 9 | 1> | 20.8 | 3.5 | 15.5 |
| 10 | 1> | 22.8 | 6.1 | 17.4 |
| 11 | 1> | 19.9 | 7.8 | 14.4 |
| 12 | 1> | 17.6 | 2.8 | 15.1 |
| 13 | 1> | 32.8 | 9.9 | 25.9 |
| 14 | 1> | 20.2 | 1.8 | 17.1 |
| 15 | 1> | 17.9 | 11.3 | 11.5 |
| 16 | 1> | 18.0 | 5.5 | 14.8 |
| 17 | 1> | 16.7 | 2.9 | 13.3 |
| 18 | 1> | 20.7 | 15.1 | 12.9 |
| 19 | 1> | 18.3 | 19.1 | 13.2 |
| 20 | 1> | 19.4 | 3.0 | 16.5 |
| 21 | 1> | 17.2 | 2.5 | 14.9 |
| 28 | 1> | 9.8 | — | — |
| 29 | 1> | 7.9 | — | — |
| 30 | 1> | 7.5 | — | — |
| 31 | 1> | 8.1 | — | — |
| Comparative Product | | | | |
| 5 | 1> | seizure | | |
| 6 | 1> | seizure | | |
| 7 | 104 | 46.3 | | |
| 8 | 1> | 41.3 | | |

EXAMPLE 5

With respect to the inventive products 22, 24, 30, 32, 33 and 34, the preventive effect of benzotriazole on copper plating was examined. To 10 g of oil and 5 g of HFC134a in a glass tube, copper 2-methylhexanate was added at a ratio of 1% to the oil, iron, copper and aluminum were added as catalysts, and the glass tube was sealed. After testing at 175° C. for 14 days, the presence or absence of copper plating was visually observed. The results are shown in Table 11.

As is evident from Table 11, copper plating could be preventing by adding benzotriazole.

TABLE 11

| Present Inventive Product | Copper Plating |
|---|---|
| 22 | presence |
| 24 | presence |
| 30 | presence |

TABLE 11-continued

| Present Inventive Product | Copper Plating |
|---|---|
| 32 | absence |
| 33 | absence |
| 34 | absence |

EXAMPLE 6

To determine the thermal stability of the inventive products 1 through 35, a sealed tube test was conducted. To 10 g of oil and 5 g of HFC134a in a glass tube, iron, copper and aluminum were added as catalysts, and the glass tube was sealed. After testing at 175° C. for 14 days, the appearance of the HFC134a-oil composition and the presence or absence of precipitates were examined. The results are shown in Table 12.

As is evident from Table 12, all inventive products had a good appearance and were free of precipitates, showing good thermal stability.

TABLE 12

| Present Inventive Product | Appearance | Precipitate |
|---|---|---|
| 1 | good | nothing |
| 2 | " | " |
| 3 | " | " |
| 4 | " | " |
| 5 | " | " |
| 6 | " | " |
| 7 | " | " |
| 8 | " | " |
| 9 | " | " |
| 10 | " | " |
| 11 | " | " |
| 12 | " | " |
| 13 | " | " |
| 14 | " | " |
| 15 | " | " |
| 16 | " | " |
| 17 | " | " |
| 18 | " | " |
| 19 | good | nothing |
| 20 | " | " |
| 21 | " | " |
| 22 | " | " |
| 23 | " | " |
| 24 | " | " |
| 25 | " | " |
| 26 | " | " |
| 27 | " | " |
| 28 | " | " |
| 29 | " | " |
| 30 | " | " |
| 31 | " | " |
| 32 | " | " |
| 33 | " | " |
| 34 | " | " |
| 35 | " | " |

EXAMPLE 7

To determine the insulating property of the oils for the inventive products 3, 4, 6, 7, 9 and 10 and the comparative oils for the comparative products 7 and 8, the volume resistivity (JIS C2102) at 25° C. was measured. The results are shown in Table 13.

As is evident from Table 13, the esters for the present invention were higher in volume resistivity than polyether compounds, showing an excellent insulating property.

TABLE 13

| | Volume Resistivity ($\Omega \cdot cm$) |
|---|---|
| Oil for Present Invention | |
| 3 | $7.0 \times 10^{13}$ |
| 4 | $1.0 \times 10^{14}$ |
| 6 | $3.0 \times 10^{13}$ |
| 7 | $5.0 \times 10^{13}$ |
| 9 | $1.5 \times 10^{13}$ |
| 10 | $3.0 \times 10^{13}$ |
| Comparative Oil | |
| 7 | $7.0 \times 10^{9}$ |
| 8 | $1.0 \times 10^{10}$ |

What is claimed is:

1. A working fluid composition for a refrigerating machine comprising:
   (a) a hydrofluorocarbon; and
   (b) a refrigeration oil prepared by combining (i) a compound having an epoxycyclohexyl group and/or a compound having an epoxycyclopentyl group with (ii) an ester formed between a neopentylpolyol and a saturated branched aliphatic monocarboxylic acid having a carbon number of 7 to 9 in a ratio or 0.05 to 2.0 parts by weight to 100 parts by weight of the ester.

2. A working fluid composition for refrigerating machine comprising:
   (a) a hydrofluorocarbon; and
   (b) a refrigeration oil which comprises (i) a compound having an epoxycyclohexyl group and/or a compound having an epoxycyclopentyl group, (ii) an ester formed between a neopentylpolyol and a saturated branched aliphatic monocarboxylic acid having a carbon number of 7 to 9 in a ratio of 0.05 to 2.0 parts by weight to 100 parts by weight of the ester, and (iii) at least one member selected from the group consisting of 0.1 to 5.0 parts by weight of a triaryl phosphate, 0.1 to 5.0 parts by weight of a triaryl phosphate, 0.001 to 0.1 parts by weight of benzotriazole, 0.001 to 0.1 parts by weight of a benzotriazole derivative and 0.001 to 2.0 parts by weight of a metal deactivator capable of chelating, based on 100 parts by weight of the ester.

3. A working fluid composition for refrigerating machine according to claim 1 or 2, wherein said ester is formed between trihydric and higher polyhydric neopentylpolyol and a carboxylic acid containing a saturated branched aliphatic monocarboxylic acid and wherein at least 70% by weight of the acid used to form esters has a carbon number of 7 to 9 and wherein at least 25% by weight of the acid used to form esters is 2-methylhexanoic acid.

4. A working fluid composition for refrigerating machine according to claim 1 or 2, wherein said ester is formed between dihydric neopentylpolyol and a carboxylic acid containing 2-methylhexanoic acid at not less than 70% by weight of the total carboxylic acid content.

5. A working fluid composition for refrigerating machine according to claim 3, wherein said saturated branched aliphatic monocarboxylic acid is 2-methylhexanoic acid alone.

6. A working fluid composition for refrigerating machine according to claim 3, wherein said saturated branched aliphatic monocarboxylic acid is a mixed acid comprising 2-methylhexanoic acid and at least one acid selected from the group consisting of 2-ethylhexanoic acid, 3,5-dimethylhexanoic acid and 3,5,5-trimethylhexanoic acid.

7. A working fluid composition for refrigerating machine according to claim 3, wherein said trihydric and higher polyhydric neopentylpolyol is trimethylolpropane and/or pentaerythritol.

8. A working fluid composition for refrigerating machine according to claim 4, wherein said dihydric neopentylpolyol is neopentyl glycol.

9. A working fluid composition for refrigerating machine according to claim 1 or 2, wherein said ester is formed between 2-methylhexanoic acid and trimethylolpropane and/or pentaerythritol.

10. A working fluid composition for refrigerating machine according to claim 1 or 2, wherein said ester is formed between 2-methylhexanoic acid and neopentyl glycol.

11. A working fluid composition for refrigerating machine according to claim 1 or 2, wherein the hydroxyl value of the ester is 1 to 50 mg KOH/g.

12. The working fluid according to claim 1 or 2 wherein components (a) and (b) are contained in a weight ratio of (a):(b) in the range 5:1 to 1:10.

13. The working fluid according to claim 1 or 2 wherein components (a) and (b) are contained in a weight ratio of (a):(b) in the range 2:1 to 1:5.

14. The working fluid according to claim 1 or 2, wherein said hydrofluorocarbon is selected from the group consisting of 1,1,1,2-tetrafluoroethane, 1,1,2,2-tetrafluoroethane, 1,1-difluoroethane, 1,1,1-trifluoroethane, pentafluoroethane, and difluoromethane.

15. The working fluid according to claim 14, wherein said hydrofluorocarbon is 1,1,1,2-tetrafluoroethane.

16. The working fluid according to claim 1, wherein said compound having an epoxycyclohexyl group and said compound having an epoxycyclopentyl group are selected from the group consisting of 1,2-epoxycyclohexane, 1,2-epoxycyclopentane, bis(3,4-epoxycyclohexylmethyl)adipate, bis(3,4-epoxy-6-methylcyclohexylmethyl)adipate, 3,4-epoxycyclohexylmethyl-3,4-epoxycyclohexanecarboxylate, exo-2,3-epoxynorbornane, 2-(7-oxabicyclo[4.1.0]hepto-3-yl)-spiro(1,3-dioxane-5,3'-[7]oxabicyclo[4.1.0]heptane), 4-epoxyethyl-1,2-epoxycyclohexane and 4-(1'-methylepoxyethyl)-1,2-epoxy-2-methylcyclohexane.

17. The working fluid according to claim 16, wherein said compound having an epoxycyclohexyl group and said compound having an epoxycyclopentyl group are selected from the group consisting of 1,2-epoxycyclohexane, 1,2-epoxycyclopentane, bis(3,4-epoxycyclohexylmethyl)adipate, bis(3,4-epoxy-6-methylcyclohexylmethyl)adipate, 3,4-epoxycyclohexylmethyl-3,4-epoxycyclohexanecarboxylate and 2-(7-oxabicyclo[4.1.0]hepto-3-yl)-spiro(1,3-dioxane-5,3'-[7]oxabicyclo[4.1.0]heptane).

18. A working fluid composition for use in a refrigeration cycle comprising:
   (a) 1,1,1,2-tetrafluoroethane;
   (b) at least one ester formed by condensing a neopentylpolyol and a saturated branched aliphatic monocarboxylic acid having a carbon number of 7 to 9;
   (c) at least one compound selected from the group consisting of, 1,2-epoxycyclohexane, 1,2-epoxycyclopentane, bis(3,4-epoxycyclohexylmethyl)adipate, bis(3,4-epoxy-6-methylcyclohexylmethyl)adipate, 3,4-epoxycyclohexylmethyl-3,4-epoxycyclohexanecarboxylate, exo-2,3-epoxynorbornane, 2-(7-oxabicyclo[4.1.0]hepto-3-yl)-spiro(1,3-dioxane-5,3'-[7]oxabicyclo[4.1.0]heptane), 4-epoxyethyl-1,2-epoxycyclohexane and 4-(1'-methylepoxyethyl)-1,2-epoxy-2-methylcyclohexane; and
   (d) at least one compound selected from the group consisting of triaryl phosphates and triaryl phosphites.

19. A process of refrigeration comprising subjecting a working fluid to a refrigeration cycle, wherein the working fluid is the working fluid of claim 18.

20. In a process for refrigeration utilizing a working fluid that is subjected to repeated refrigeration cycles, the improvement for which comprises using the working fluid of claim 18 as the working fluid.

* * * * *